Patented Mar. 18, 1952

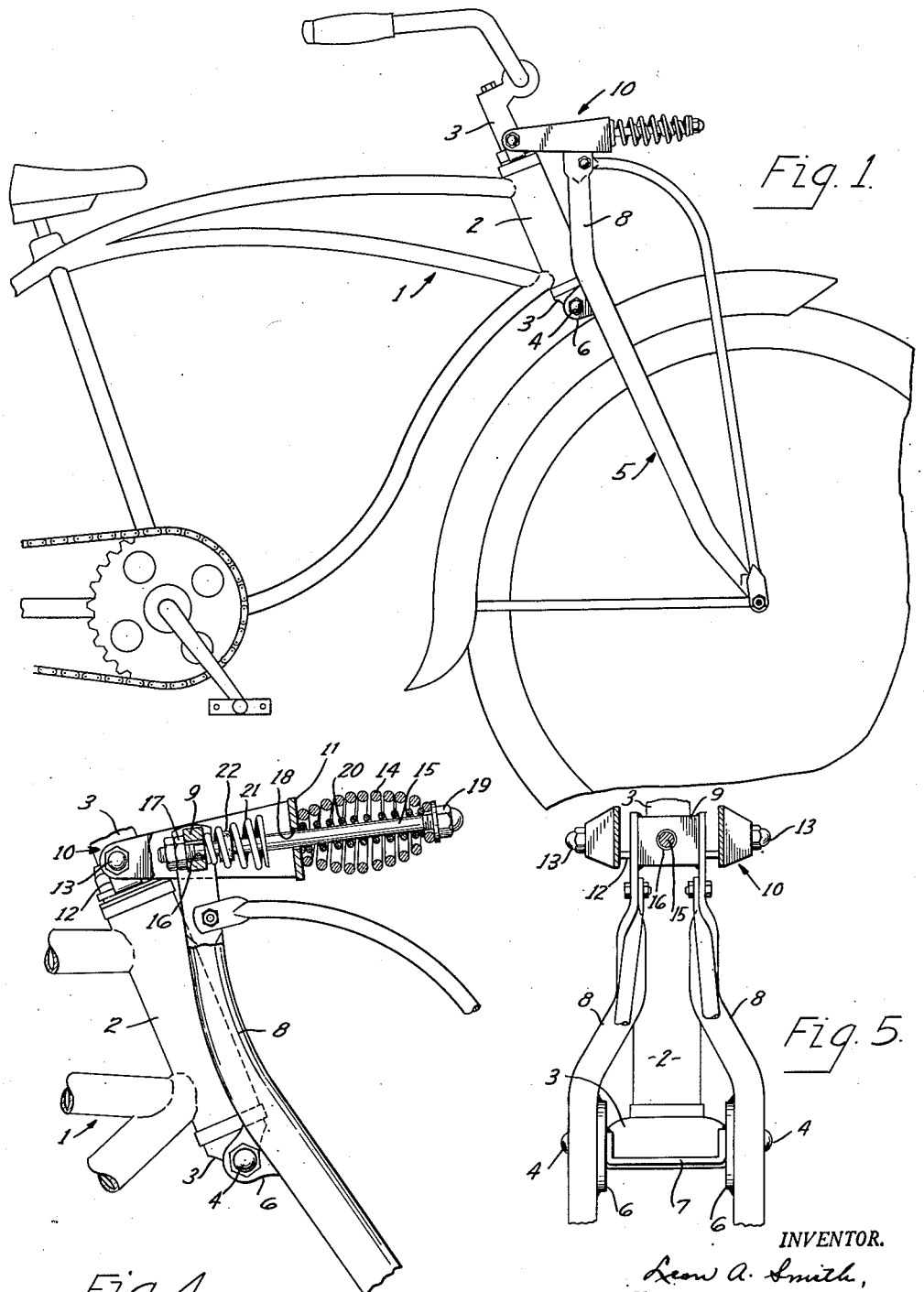

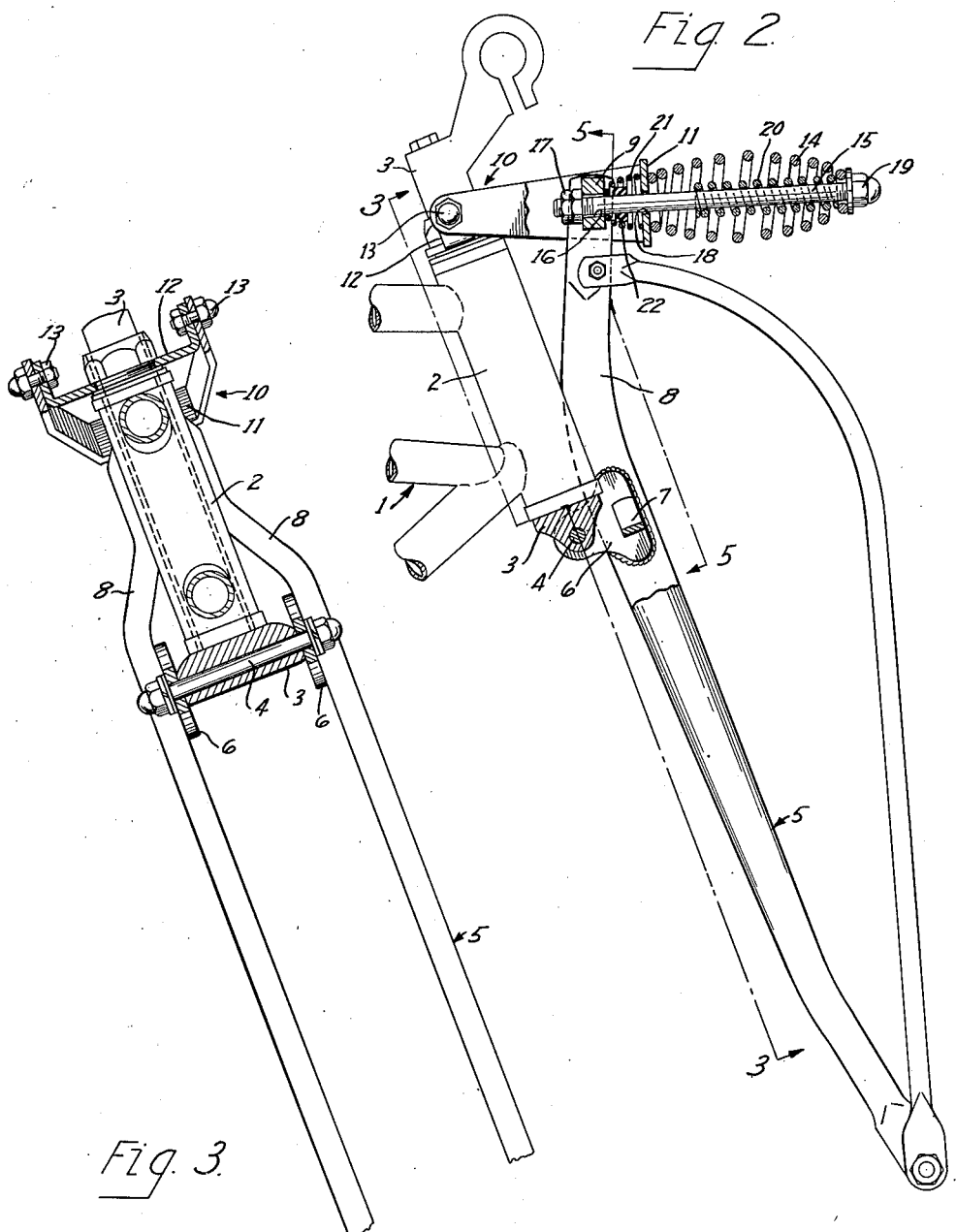

2,590,050

UNITED STATES PATENT OFFICE 2,590,050

SAFETY SHOCK ABSORBER FOR FRONT FORK STRUCTURE OF BICYCLES

Leon A. Smith, Shelby, Ohio, assignor to The Shelby Cycle Company, Shelby, Ohio, a corporation of Ohio Application August 3, 1950, Serial No. 177,403

11 Claims. (Cl. 280—276)

This invention relates to a safety shock absorbing device for the front fork of a bicycle.

Heretofore bicycles having the usual frame and steering head with a steering post mounted in the head have been provided with a front fork assembly which is pivotally connected to the lower end of the steering post so as to be dirigible therewith and rockable about a horizontal axis and which has a portion extending upwardly and forwardly from the pivotal axis. In these prior bicycles, combinations of springs and other resilient compressible means have been operatively connected to the upper end of the front fork structure above the level of its pivotal axis and to the steering post above the level of the steering head for cushioning shocks and the like transmitted to the forks by engagement of the wheel with irregularities on a roadway or supporting surface.

The prior structures for this purpose have a number of disadvantages. One disadvantage resides in the fact that in the event of breaking of the springs or detachment of the spring securing means from the upper end of the fork, the upper end of the fork is left entirely disconnected from the steering post and bicycle frame with consequent dangers to the rider. Again, difficulty has been encountered in providing sufficient adjustment for the springs so that the same structure can operate effectively for riders of widely different weights. Furthermore, a number of the prior structures are relatively complicated and expensive considering the function they are to perform.

The present invention utilizes a front fork structure mounted for rocking about a horizontal axis on the bottom of the steering post and with portions extending upwardly and forwardly from the pivotal axis above the level of the top of the steering head.

In accordance with the present invention, the upper end of the front fork structure is confined between the arms and base of a yoke, the free ends of the arms of which are pivotally connected to the steering post a short distance above the upper end of the steering head and extend forwardly substantially horizontally, and the base of which is spaced forwardly from the post. Suitable resilient means are operatively connected to the yoke and to the upper end of the front fork structure for cushioning shocks upon predetermined rocking movement of the fork about its pivotal axis on the steering post.

An additional feature is that the resilient cushioning means and the connections thereof to the steering post, yoke and front fork structure are so arranged that in event of failure of the cushioning means, or detachment of their connecting parts, the upper end of the front fork structure remains confined by the yoke so as to permit only a limited rocking movement about the horizontal pivotal axis of the fork. Furthermore, more effective adjustment of the cushioning means is provided for rendering the cushioning means effective for riders of greatly different weights.

Briefly and more specifically the invention consists in mounting the front fork structure on the lower end of the steering post by a horizontal pivot in the well known manner with the arms of the fork extending upwardly and forwardly from the pivotal axis to a point substantially at the same level as the portion of the steering post exposed immediately above the steering head, confining the upper end of the fork structure within a yoke the open end of which is connected to the steering post and the base of which is spaced forwardly therefrom so that the upper end of the front fork lies between the yoke arms, base, and the steering post. Suitable resilient compressible means are arranged to engage the front and rear of the base of the yoke, respectively, these cushioning means being operatively connected to the upper end portion of the front fork structure. A rod extends therethrough and through the base of the yoke, and one cushioning means is interposed between the front of the base of the yoke and a shoulder on the forward end of the rod. The other cushioning means is interposed between the rear of the base of the yoke and the forward face of the upper end portion of the front fork structure.

Various additional advantages and features of the invention will become apparent from the following description wherein reference is made to the drawings, in which:

Fig. 1 is a fragmentary side elevation of a bicycle showing the front fork shock absorbing mounting of the present invention in normal unstressed position;

Fig. 2 is an enlarged fragmentary side elevation, partly in section, showing the position of the parts of the fork mounting when the fork is subjected to shocks or forces applied to the front wheel in a direction directly rearwardly of the bicycle;

Fig. 3 is a sectional view taken on the line 3—3 of Fig. 2;

Fig. 4 is an enlarged fragmentary sectional view similar to Fig. 2 showing the fork and shock absorbing mounting therefor when the fork is subjected to shocks or forces applied upwardly to the front wheel or when the bicycle is supporting heavy loads; and Fig. 5 is a fragmentary sectional view taken on the line 5—5 of Fig. 2.

Referring to the drawings, the bicycle includes the usual frame, indicated generally at 1, with a steering head 2 in which is mounted the usual steering post 3, the lower end of which extends below the bottom of the head 2. Pivotally mounted on the lower end of the steering post 2 by means of a suitable pivot 4 is a front fork structure, indicated generally at 5, to the lower end of which the front wheel is mounted in the usual manner. The pivot 4 is preferably horizontal and it and the fork structure 5 are dirigible with the steering post.

For connecting the arms of the fork structure 5 to the pivot 4, suitable rearwardly extending lugs 6 are brazed or otherwise securely fastened to the arms of the fork, respectively, and extend rearwardly therefrom. They are provided with apertures adapted to receive the pivot 4. In order to afford greater rigidity a transverse bracket 7 is brazed or rigidly connected to the inner faces of the lugs 6 and spans the distance therebetween. The bracket 7 also provides a means for securing the front fender to the front fork assembly.

The arms of the fork structure 5 extend upwardly and forwardly from the axis of the pivot 4, as indicated at 8, and at their upper end are preferably rigidly connected together by suitable means such as a connecting portion 9 which may be in the form of a block of metal brazed to both arms, thus providing a fork structure which is a single rigid unit.

Mounted on the steering post 3 at the portion thereof immediately above the steering head 2 is a yoke 10 the free ends of the arms of which are connected to the steering post 3. The yoke arms extend forwardly so that the yoke base 11 is in spaced relation forwardly with respect to the post 3. The connecting portion 9 of the upper end of the upper portion of the arms 8 is confined between the arms of the yoke 10, the steering post 3, and the base of the yoke 10. Thus the upper end of the fork structure is confined at all times so that in event of failure of the resilient cushioning means and their connecting elements, greater safety is afforded the rider of the bicycle.

In the form illustrated, and preferably, the arms of the yoke 10 are pivotally connected at their free ends to the steering post 3 for vertical rocking movement about a horizontal axis extending transversely of the bicycle frame. A suitable form of connection may comprise a bracket 12 secured to the post 3 for rotation therewith. At its ends it is secured to the arms of the yoke 10, respectively, by means of suitable bolts 13.

Operatively interposed between the front of the base 11 of the yoke and the upper ends of the arms 12 are suitable resilient compressible means adapted to relieve or cushion such shocks as are imposed on the fork structure and tend to rock the fork structure so that the upper end moves rearwardly of the bicycle. In the form illustrated, the resilient compressible means comprises a spring 14. For operatively connecting the spring 14 between the upper end portions 8 of the fork arms and the yoke base 11, a suitable rod 15 is provided. The rod 15 is carried at its rear end by the upper portions 8 of the arms, preferably by the block 9, which has an aperture 16 through which the rod 15 extends and in which it is freely slidable or movable endwise of the rod. Suitable adjusting nuts 17 are in threaded engagement with the end of the rod at the rear of the block 9. The base 11 of the yoke 10 is provided with an aperture 18 through which the rod extends so that its forward end is positioned forwardly beyond the yoke. A nut 19 is in threaded engagement with the forward end of the rod 15 and provides a rearwardly facing abutment shoulder between which and the front end of the base 11 the spring 14 is interposed. Thus any forces imposed on the fork structure tending to rock the upper end 8 of the fork arms rearwardly about the axis 4 are cushioned and resisted by the spring 14. This cushioning effect can be adjusted to a substantial degree by means of the adjustment of the nuts 17 and 19, or either of them. As mentioned, however, it is often desirable to provide a greater range than can be afforded normally by a single spring. For example, for a very light rider, the spring 14 may be adequate in which case for a much heavier rider it might be substantially fully compressed by the weight of the rider himself. On the other hand, if the spring 14 were made sufficiently stiff to support the weight of a very heavy rider without undue compression, it would be too stiff to provide any cushioning effect for a light rider.

Accordingly, therefore, an auxiliary spring 20 is provided, the auxiliary spring being stiffer than the spring 14 and shorter so as not to become effective until after a predetermined compression and shortening of the spring 14. As illustrated, the spring 20 may be carried on the rod 15 so as to be compressed between the shoulder of the nut 19 and the front of the base 11 of the yoke 10. In choosing the springs, it has been found most effective to arrange the springs so that the spring 14 is active throughout a substantial range of movement under the weight of riders up to 150 pounds, after which it is sufficiently compressed so that the inner spring 20 becomes effective. Thus the inner spring serves to counterbalance the weight of extremely heavy riders and both springs are operative to relieve the fork structure from severe shocks. The spring 14 is effective under normal shocks for a light rider and the combined effect of the springs 14 and 20 is effective for a heavy rider and for severe shocks under any circumstances. Under the most extreme conditions of shock, even with a light rider, the spring 20 may become effective and supplement the spring 14.

In order to relieve the fork structure from shocks caused by forces directed rearwardly on the front wheel, suitable resilient cushioning means are provided between the block 9 and the rear of the base 11 of the yoke. In the form illustrated, such a cushioning means is in the form of a coil compression spring 21 which may be arranged in surrounding relation to the rod 15 and which at its ends abuts the block 9 and the rear face of the base 11 of the yoke 10, respectively. As best illustrated in Fig. 4 the spring 21 usually is inoperative and merely floats on the rod 15 under normal operating conditions.

In addition to the spring 21, provision is made for cushioning extreme shocks. The means for this purpose is shown as a rubber washer 22 which is mounted on the rod 15 for floating movement endwise thereof and which is of such thickness forwardly and rearwardly as to become operative somewhat before the convolutions of the spring 21 are brought in contact with each other.

Preferably the horizontal pivotal axis of the pivot 4 intersects the rotational axis of the steering post 3. The pivotal connection between the yoke 10 and the steering post 3 and the point of connection of the upper end portions 8 of the fork arms to each other are so arranged that in the normal operating condition under the average load, the yoke 10 and rod 15 extend substantially horizontally. Thus the movement of the block 9 with the upper ends of the fork arms is substantially tangential to the forward and rearward axis of the yoke 10.

As a result of the structure described, it is apparent that in event of stripping of the threads of the rod 15 or of the nuts 17 or 19, or breakage of the springs, the upper end of the fork structure remains confined by the yoke 10 and the danger which would otherwise result from the upper end of the arms being free is eliminated.

Furthermore, the cushioning means are readily adjustable for different weights of riders and provision is made in addition to this adjustment for retaining an effective cushioning effect, with a device of limited size, for riders of widely varying weights.

Having thus described my invention, I claim:

1. In a bicycle including a frame with a steering head, a steering post rotatably mounted in the head, and a front fork structure dirigible with the post and pivotally connected to the lower end thereof for rocking about a horizontal axis; a yoke dirigible with the post and pivotally connected to the post above the head for rocking about a horizontal axis and with its base spaced forwardly of the post, said base having an aperture therein, said front fork structure having arms which extend upwardly and forwardly from its pivotal axis and having an upper connecting portion lying between the yoke arms, a forwardly and rearwardly extending rod mounted on said connecting portion and extending endwise through said aperture and being movable endwise relative to the yoke, means providing an abutment shoulder on the forward end of the rod, and resilient compression means interposed between said shoulder and the front of the base of the yoke.

2. A structure according to claim 1 characterized in that said resilient compression means comprises a coil spring normally operatively engaging both the front of the base of the yoke and said abutment shoulder, and auxiliary compression means which are stronger and normally shorter than the coil spring and are located between said front of the base of the yoke and said abutment shoulder and which are engageable initially for compression therebetween only after predetermined compression of the spring.

3. A structure according to claim 1 characterized in that resilient compression means are interposed between said connecting portion and the rear of the base of the yoke.

4. A structure according to claim 3 characterized in that said rod is adjustable in effective length for varying the stress on the resilient compression means.

5. A structure according to claim 3 characterized in that said rod is mounted on said connecting portion for limited endwise floating movement relative thereto.

6. A structure according to claim 3 characterized in that each of said resilient compression means is a coil spring.

7. A structure according to claim 6 characterized in that a resilient rubber bumper is interposed between said connecting portion and rear of the base of the yoke and is engageable for compression therebetween only after predetermined compression of the compression spring therebetween.

8. In a bicycle including a frame with a steering head, a steering post rotatably mounted in the head, a front fork structure dirigible with the post and pivotally connected to the lower end thereof for rocking about a horizontal axis; a yoke dirigible with the post and pivotally connected to the post above the head for rocking about a horizontal axis and with its base spaced forwardly of the post, said base having an aperture therein, said front fork structure having arms which extend upwardly and forwardly from its pivotal axis and have an upper connecting portion lying between the yoke arms, said connecting portion having an aperture therein, a forwardly and rearwardly extending rod slidable endwise in said aperture of the connecting portion and extending endwise through, and slidable endwise in, the aperture in the yoke, abutment means providing shoulders on the rod rearwardly of the connecting portion and forwardly of the base of the yoke, respectively, at least one of said abutment means being adjustable endwise of the rod, a coil compression spring and a rubber bumper mounted on the rod for endwise floating movement relative thereto and disposed between the said connecting portion and rear of the yoke, a pair of coil compression springs mounted on the rod for endwise floating movement relative thereto and disposed between the said abutment means of the forward end of the rod and the front of the base of the yoke.

9. In a bicycle including a frame with a steering head, a steering post rotatably mounted in the head, a front fork structure dirigible with the post and pivotally connected to the lower end thereof for rocking forwardly and rearwardly about a horizontal axis, a yoke dirigible with the post and connected to the post above the head with its base spaced forwardly from the head, said front fork structure extending upwardly and forwardly from its pivotal axis and having an upper portion lying between the yoke arms and rearwardly of said base, and resilient compressible means interposed between and engaging the base of the yoke and the upper portion of said fork for resiliently resisting predetermined rocking movement of said fork about its horizontal pivotal axis.

10. In a bicycle including a frame with a steering head, a steering post rotatably mounted in the head, a front fork structure dirigible with the post and pivotally connected to the lower end thereof for rocking about a horizontal axis, a yoke dirigible with the post and pivotally connected to the post above the head for rocking about a horizontal axis and with its base spaced forwardly of the post, said base having an aperture therein, said front fork structure having arms which extend upwardly and forwardly from its pivotal axis and have an upper connecting portion lying between the yoke arms, said connecting portion having an aperture therein, a forwardly and rearwardly extending rod slidable endwise in said aperture of the connecting portion and extending endwise through, and slidable endwise in, the aperture in the yoke, abutment means providing shoulders on the rod rearwardly of the connecting portion and forwardly of the base of the yoke, respectively, resilient common means mounted on the rod and disposed between said connecting portion and the rear of the yoke, and additional resilient compression means mounted on the rod and disposed between said abutment means of the forward end of the rod and the front of the base of the yoke.

11. The structure according to claim 10 characterized in that all of said resilient compression means are mounted on the rod for floating movement relative to the rod endwise of the rod.

LEON A. SMITH.

REFERENCES CITED

The following references are of record in the file of this patent:

UNITED STATES PATENTS

| Number | Name | Date |
|---|---|---|
| 689,970 | Horack | Dec. 31, 1901 |
| 2,160,034 | Schwinn | May 30, 1939 |
| 2,330,892 | Horstman | Oct. 5, 1943 |

FOREIGN PATENTS

| Number | Country | Date |
|---|---|---|
| 116,335 | Great Britain | June 5, 1918 |
| 551,433 | France | Jan. 8, 1923 |